(12) United States Patent
Bahng et al.

(10) Patent No.: US 7,782,989 B2
(45) Date of Patent: Aug. 24, 2010

(54) APPARATUS AND METHOD FOR ACQUIRING FRAME TIMING IN COMMUNICATION SYSTEM

(75) Inventors: Seung-Jae Bahng, Annyang (KR); Youn-Ok Park, Daejeon (KR); Chang-Wahn Yu, Daejeon (KR); Eon-Young Hong, Daejeon (KR)

(73) Assignees: Samsung Electronics Co., Ltd. (KR); Electronics and Telecomminications Research Institute (KR); KT Corporation (KR); SK Telecom Co., Ltd. (KR); Hanare Telecom, Inc. (KR)

( * ) Notice: Subject to any disclaimer, the term of this patent is extended or adjusted under 35 U.S.C. 154(b) by 894 days.

(21) Appl. No.: 11/636,797

(22) Filed: Dec. 11, 2006

(65) Prior Publication Data

US 2007/0133728 A1    Jun. 14, 2007

(30) Foreign Application Priority Data

Dec. 10, 2005    (KR)    ...................... 10-2005-0121352

(51) Int. Cl.
*H04L 7/00* (2006.01)
(52) U.S. Cl. ..................................................... 375/354
(58) Field of Classification Search ................. 375/260, 375/267, 296, 319, 343, 354, 369, 371; 370/206, 370/315, 324, 345, 347
See application file for complete search history.

(56) References Cited

U.S. PATENT DOCUMENTS

| | | | |
|---|---|---|---|
| 6,643,336 B1 * | 11/2003 | Hsieh et al. | ................. 375/343 |
| 2004/0213353 A1 * | 10/2004 | Hwang et al. | ............... 375/267 |
| 2006/0062324 A1 * | 3/2006 | Naito et al. | ................. 375/296 |

FOREIGN PATENT DOCUMENTS

KR    2005-0066562    6/2005

* cited by examiner

*Primary Examiner*—David C Payne
*Assistant Examiner*—Syed Haider
(74) *Attorney, Agent, or Firm*—The Farrell Law Firm, LLP

(57) ABSTRACT

Disclosed is an apparatus for acquiring initial frame timing in a communication system having a normalizer that calculates a normalized window power from powers of samples of received signal during a monitoring period, a cross power calculator that calculates a window cross power from cross powers of the samples during the monitoring period, and each cross power corresponds to multiplication of two of the samples, a divider that divides the window cross power by the normalized window power and outputs a metric for a sample corresponding to the monitoring period, and a peak-value detector that searches a sample having the maximum value among metrics for the samples of the received signals during a predetermined period, and the metrics are calculated by shifting the monitoring period, with a sample next to the sample searched by the peak-value detector being determined as a starting point of a frame.

14 Claims, 7 Drawing Sheets

APPARATUS AND METHOD FOR ACQUIRING FRAME TIMING IN COMMUNICATION SYSTEM

PRIORITY

This application claims priority to Korean Patent Application No. 10-2005-0121352, which was filed in the Korean Intellectual Property Office on Dec. 10, 2005, the contents of which are incorporated herein by reference.

BACKGROUND OF THE INVENTION

1. Field of the Invention

The present invention relates to an apparatus and a method for acquiring frame timing in a communication system.

2. Description of the Related Art

Conventional systems, such as the systems discloses in Korean patent publication No. 2005-0066562 include a constructing scheme of a preamble in a communication system, a method for acquiring a frame timing using the preamble, and a method for searching cell. Such a conventional system discloses an initial frame timing method using an auto-correlation method at a single cell structure. If signals sent from three base stations having respectively different segment numbers are simultaneously received at a terminal locating at a cell edge, a repeating characteristic of a preamble at a time domain in the single cell will disappear. Such a phenomenon can cause failure of a timing acquisition when this auto-correlation based method is used for acquiring an initial frame timing.

SUMMARY OF THE INVENTION

The present invention has been made in an effort to provide an apparatus for acquiring frame timing and a method thereof having advantages of successfully acquiring initial frame timing even if signals transmitted from a plurality of base stations are simultaneously received.

An exemplary embodiment of the present invention provides an apparatus for acquiring initial frame timing in a communication system. The apparatus includes a normalizer, a cross power calculator, a divider, and a peak-value detector. The normalizer calculates a normalized window power from powers of samples of received signal during a monitoring period. The cross power calculator calculates a window cross power from cross powers of the samples during the monitoring period, and each cross power corresponds to multiplication of two of the samples. The divider divides the window cross power by the normalized window power and outputs a metric for a sample corresponding to the monitoring period. The peak-value detector searches a sample having the maximum value among metrics for the samples of the received signals during a predetermined period, and the metrics are calculated by shifting the monitoring period. A sample next to the sample searched by the peak-value detector is determined as a starting point of a frame.

Another embodiment of the present invention provides a method for acquiring initial frame timing in a communication system. The method includes extracting first samples and second samples delayed from the first samples among samples belonging to a monitoring period while shifting the monitoring period for received signals; calculating a ratio between a first value corresponding to cross powers between the first samples and the second samples and a second value corresponding to respective powers of the first and second samples, in each of shifted monitoring periods; and setting a sample next to a sample corresponding to the monitoring period having a maximum ratio among the ratios for the shifted monitoring periods as a starting point of a frame.

Yet another embodiment of the present invention provides an apparatus for acquiring initial frame timing in a communication system. The apparatus includes means for extracting first samples within a window and second samples delayed from the first samples among samples of a monitoring period while shifting the monitoring period; means for calculating a ratio between a first value corresponding to cross powers between the first samples and the second samples and a second value corresponding to respective powers of the first and second samples, in each of shifted monitoring periods; and means for acquiring a starting point of a frame from a maximum ratio among the ratios for the shifted monitoring periods.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
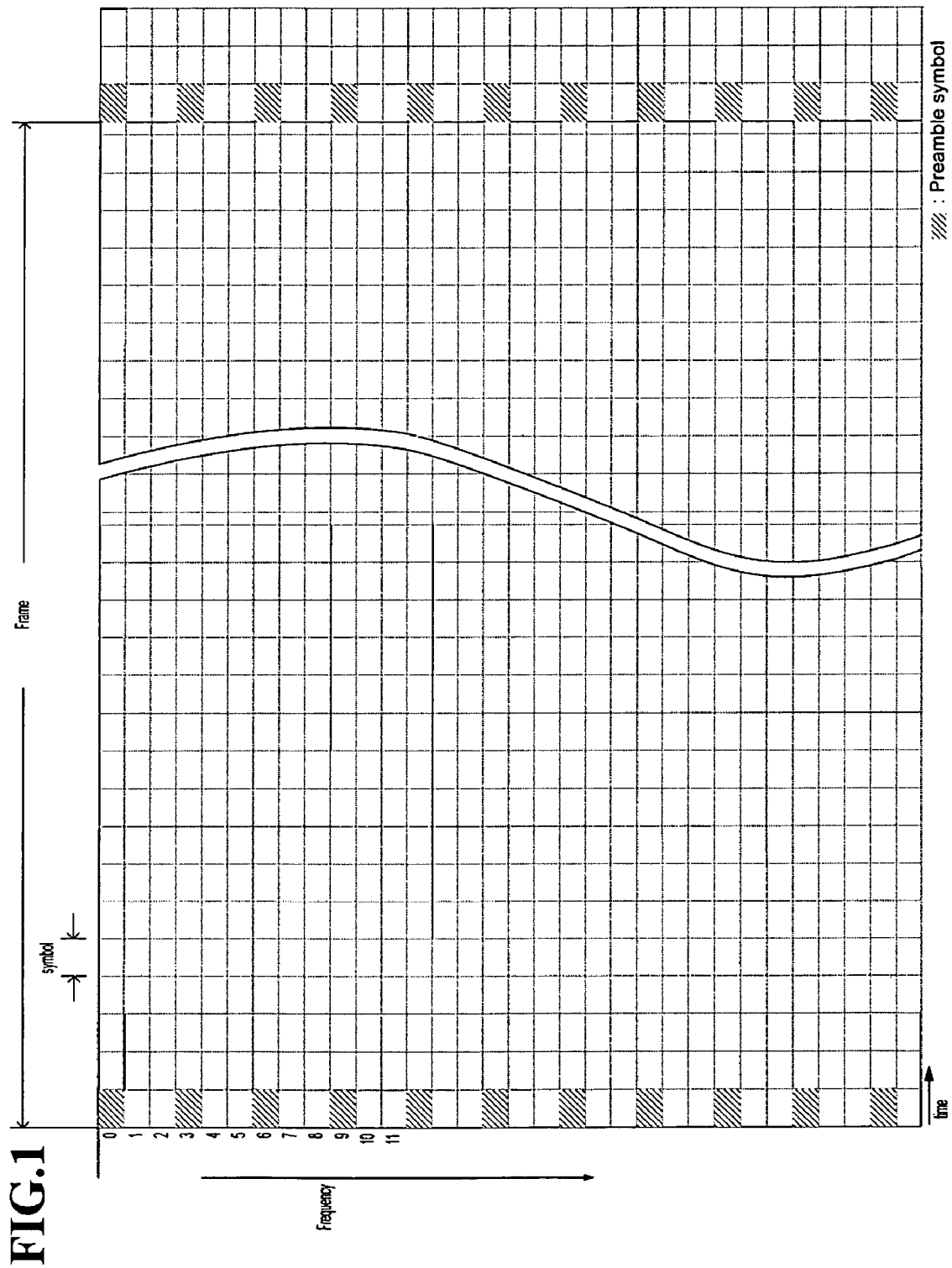
FIG. 1 illustrates a frame structure of a communication system according to an exemplary embodiment of the present invention.

Preferred embodiments of the present invention will be described in detail herein below with reference to the accompanying drawings. The following description includes information necessary to understand an operation of the present invention, omitting unnecessary description for the sake of clarity and conciseness.

In the following detailed description, preferred embodiments of the present invention are shown and described. As those skilled in the art would realize, the described embodiments may be modified in various different ways, without departing from the spirit or scope of the present invention. Accordingly, the drawings and description are to be regarded as illustrative in nature and not restrictive. Like reference numerals designate like elements throughout the specification.

Figure 2:
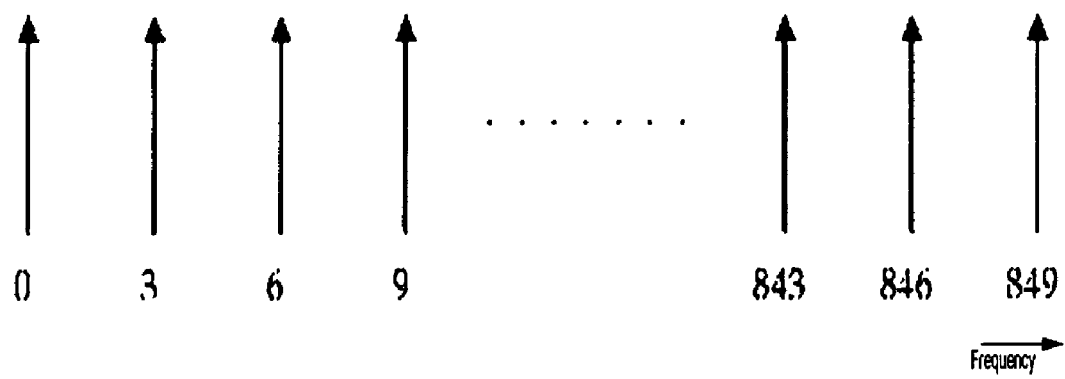
FIG. 2 illustrates allocation of subcarriers forming a preamble of FIG. 1.

FIG. 1 illustrates a frame structure of a communication system according to an exemplary embodiment of the present invention. FIG. 2 illustrates allocation of subcarriers forming the preamble of FIG. 1.

As shown in FIG. 1, each frame includes 42 symbols, such as Orthogonal Frequency Division Multiplex Access (OFDMA) symbols. Among those symbols, a preamble symbol is located as the first symbol, and is used for acquiring initial timing, calculating a frequency offset, recognizing a Cell ID (identifier), and so on. For these reasons, the preamble symbol may likely be transmitted with higher power than data symbols. For example, in the IEEE 802.16e standard the preamble power may be boosted by 9 dB. Among 1024 subcarriers, 172 subcarriers for a guard band and 851 subcarriers except one central subcarrier (i.e., DC subcarrier) are used for transmitting preamble signal. As shown in FIG. 2, preamble pattern of the preamble symbol is composed of a plurality of subcarriers in a frequency dimension. Spacing between two adjacent subcarriers forming the preamble pattern is a period corresponding to 3 subcarriers.

Preamble patterns that are differently given to each cell or segment are modulated, e.g. by Binary Phase Shift Keying (BPSK), and allocated to a subcarrier to be used. Accordingly, the preamble has a repeating structure, in which same signals having a predetermined sample period are repeated three times, in a time dimension. A conventional initial timing algorithm acquires initial frame timing using the auto-correlation of the preamble.

According to an initial frame timing method based on an auto-correlation, Equation (1) provided as an example below is calculated in a window having an 811 sample size during a monitoring period of 1152 samples. The 1152 samples correspond to 128 Cyclic Prefixes (CPs) and 1024 Inverse Fast Fourier Transform (IFFT) outputs. Subsequently, Equation (1) is successively calculated with shifting the monitoring period rightward, and a next sample of a sample having a peak value among output values according to Equation 1 during a predetermined period is set as a starting point of a frame.

$$\Lambda_n = \left| \sum_{i=0}^{810} x_{n+i} x_{n+i+341}^* \right| \quad (1)$$

where n denotes a starting position of the monitoring period, $X_{n+i}$ denotes a complex signal of an i-th sample in the monitoring period.

However, as described beforehand, an initial frame timing method using an auto-correlation method is not proper for a multi-cell environment. Therefore, the present invention provides a method for acquiring initial frame timing at multiple cells as well as a single cell by using a characteristic of high transmission power in a preamble.

When $\{x_i\}$ (here, $X_i$ denotes a complex signal) denotes a sample of a received signal, power of each sample can be obtained as $|x_i|^2$. Each sample can be classified by a size and a phase, and an absolute value of a product of different samples can be determined as shown in Equation (2) below. Hereinafter, the absolute value of a product of different samples is represented as a cross power.

$$|x_j x_k| = |x_j| e^{xj} |x_k| e^{xk} = |x_j| |x_k| \quad (2)$$

Figure 3:
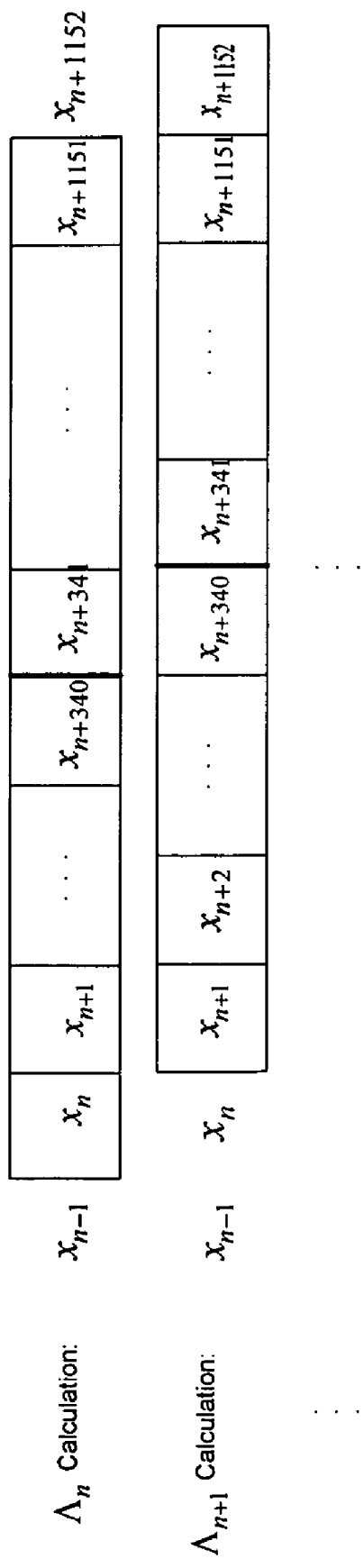
FIG. 3 shows a received sample according to the exemplary embodiment of the present invention.
Figure 4:
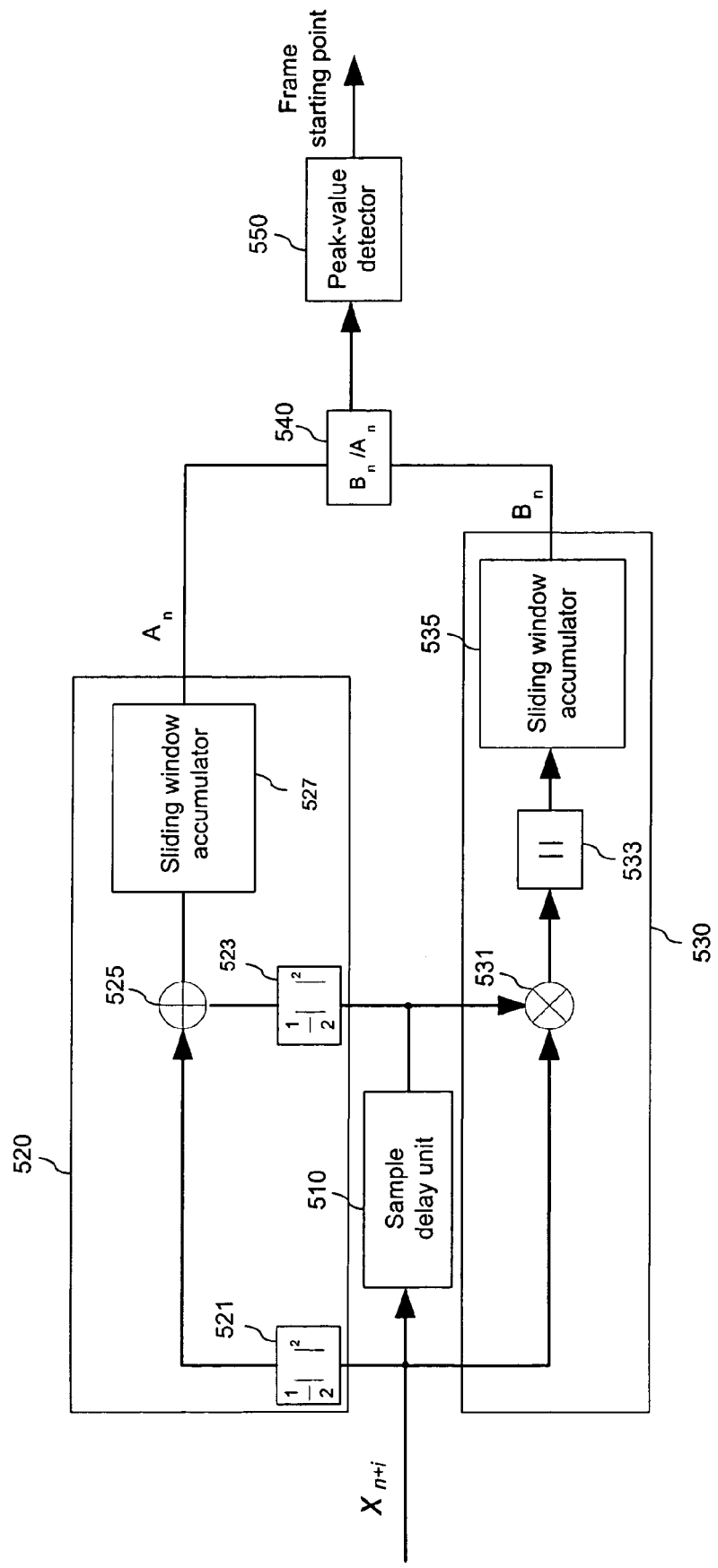
FIG. 4 is a block diagram of an apparatus for acquiring frame timing according to the exemplary embodiment of the present invention.

Referring to FIG. 3 and FIG. 4, an initial frame timing method according to the present invention is described in detail.

FIG. 3 shows a received sample according to the present invention. Referring to FIG. 3, a monitoring period includes a plurality of samples of one symbol size. For example, the monitoring period is composed of 1152 samples including a Cyclic Prefix (CP), and a window size may be an 811 sample size. The sizes of the monitoring period and the window may be determined in a range that a conventional auto-correlation based algorithm is not largely changed, and may be determined as a different sample size. For example, a size of a monitoring period may be a 1152 sample size, and the window size may be a 576 sample size, with cross power between two samples located 576 samples apart.

In an initial frame timing algorithm according to an exemplary embodiment the present invention, when a receiver receives samples as shown in FIG. 3, a metric $\Lambda_n$, as in Equation (3) below, is calculated in a window of an 811 sample size during a monitoring period of an 1152 sample size. That is, the metric $\Lambda_n$ is calculated by dividing a window cross power $B_n$ by a normalized window power $A_n$.

$$\Lambda_n = B_n / A_n \quad (3)$$

$$B_n = \sum_{i=0}^{810} |x_{n+i} x_{n+i+341}|$$

$$A_n = \frac{1}{2} \sum_{i=0}^{810} \{|x_{n+i}|^2 + |x_{n+i+341}|^2\}$$

Where n denotes a natural number corresponding to a starting position of the monitoring period, $X_{n+i}$ denotes an i-th sample within the window according to the monitoring period, and (810+1) is a size of the window.

Here, the metric $\Lambda_n$, $\Lambda_{n+1}$, . . . of Equation (3) is successively calculated with shifting the monitoring period rightward, and a next sample to a sample having a maximum value among output values $\Lambda_n$, $\Lambda_{n+1}$, . . . corresponding to the shifted monitoring periods of Equation (3) during a predetermined period is set as a starting point (i.e., a starting sample) of a frame. Assuming that the metric $\Lambda_{n+k-1}$ of $k^{th}$ monitoring period is the peak-value, a sample $x_{n+k}$ next to a sample $x_{n+(k-1)}$ corresponding to the $k^{th}$ monitoring period is a starting sample of the frame.

In order to calculate the matrix of Equation (3), a sliding window method may be used. In other words, $\Lambda_{n+1}(A_{n+1}, B_{n+1})$ can be easily obtained by Equation (4) below from the previously calculated $(A_n, B_n)$.

$$\Lambda_{n+1} = B_{n+1}/A_{n+1}$$

$$B_{n+1} = B_n - |x_n x_{n+341}| + |x_{n+811} x_{n+811+341}|$$

$$A_{n+1} = A_n - 0.5|x_n|^2 - 0.5|x_{n+341}|^2 + 0.5|x_{n+811}|^2 0.5|$$
$$x_{n+811+341}|^2 \quad (4)$$

An apparatus for the algorithm according to the present invention is shown in FIG. 4. FIG. 4 is a block diagram of an apparatus for acquiring frame timing according to the present invention. As shown in FIG. 4, the apparatus for acquiring frame timing according to the present invention comprises a sample delay unit 510, a normalizer 520, a cross power calculator 530, a divider 540 and a peak-value detector 550.

The sample delay unit 510 delays a received sample $x_{n+i}$ and outputs delayed sample $x_{n+i+341}$ so that the delayed sample $x_{n+i+341}$ can be included in the window. Because the received sample should be delayed by a 341 sample size in order to be included in the window considering that the window has an 811 sample size and the monitoring period has an 1152 sample size, the sample delay unit 510 delays the received sample $x_{n+i}$ by a 341 sample size and outputs the delayed sample $x_{n+i+341}$.

The normalizer 520 calculates normalized window power of the received signal from an average value of the powers of the received samples of the received signal. For this purpose, the normalizer 520 comprises a first normalizer 521, a second normalizer 523, an adder 525 and a sliding window accumulator 527.

The first normalizer 521 squares the received sample $x_{n+i}$ and outputs $$\left(\frac{1}{2}|x_{n+i}|^2\right),$$

i.e. half of the absolute value $|x_{n+i}|^2$ thereof. The second normalizer 523 squares the delayed sample $x_{n+i+341}$ outputted from the sample delay unit 510 and outputs $$\left(\frac{1}{2}|x_{n+i+341}|^2\right),$$

i.e. half of the absolute value thereof.

The adder 525 sums the outputted value of the first normalizer 521 and the second normalizer 523 and outputs the result $$\left(\frac{1}{2}\{|x_{n+i}|^2 + |x_{n+i+341}|^2\}\right).$$

The sliding window accumulator 527 shifts the number (i) of the sample $x_{n+i}$ in order to obtain a normalized window power for the samples within the window and adds the results outputted from the adder 525.

The cross power calculator 530 calculates the cross powers of the received samples and outputs a window cross power. For this purpose, the cross power calculator 530 comprises a multiplier 531, an absolute value calculator 533 and a sliding window accumulator 535.

The multiplier 531 multiplies the received sample $x_{n+i}$ and the delayed sample $x_{n+i+341}$ outputted from the sample delay unit 510 and outputs a result $x_{n+i}x_{n+i+341}$. The absolute value calculator 533 calculates the absolute value $|x_{n+i}x_{n+i+341}|$ of the result outputted from the multiplier 531.

The sliding window accumulator 535 shifts the number (i) of the sample $x_{n+i}$ in order to obtain a window cross power for the samples within the window, and adds the absolute value outputted from the absolute value calculator 533.

The divider 540 divides the window cross power $$B_n = \sum_{i=0}^{810} |x_{n+i}x_{n+i+341}|$$

from the cross power calculator 530 by the normalized window power $$A_n = \frac{1}{2}\sum_{i=0}^{810} \{|x_{n+i}|^2 + |x_{n+i+341}|^2\}$$

from the normalizer 520, and outputs the metric $\Lambda_n = B_n/A_n$ corresponding to the monitoring period.

The peak-value detector 550 detects a peak-value that is a maximum value among the metrics $\Lambda_n, \Lambda_{n+1}, \ldots$ from the divider 540 by shifting the monitoring period and outputs the value representing the sample having the peak-value. Consequently, a sample next to the sample corresponding to the peak-value becomes a starting point of a frame according to the initial frame timing.

In order to show performance of the apparatus for initial frame timing and the algorithm thereof according to the present invention, a following simulation was performed.

In this simulation, a terminal is provided at edges of three cells. Here, each of three sectors related with the terminal position has a different segment number. It is assumed that 9 UL PUSC (UpLink Partially Used SubChannelization) symbols, an RTG (Receive/transmit Transition Gap), a preamble, and 4 DL PUSC (DownLink Partially Used SubChannelization) symbols are generated, one symbol has 1152 samples, and the DL PUSC symbol starts at the $11925^{th}$ sample.

Figure 5A:
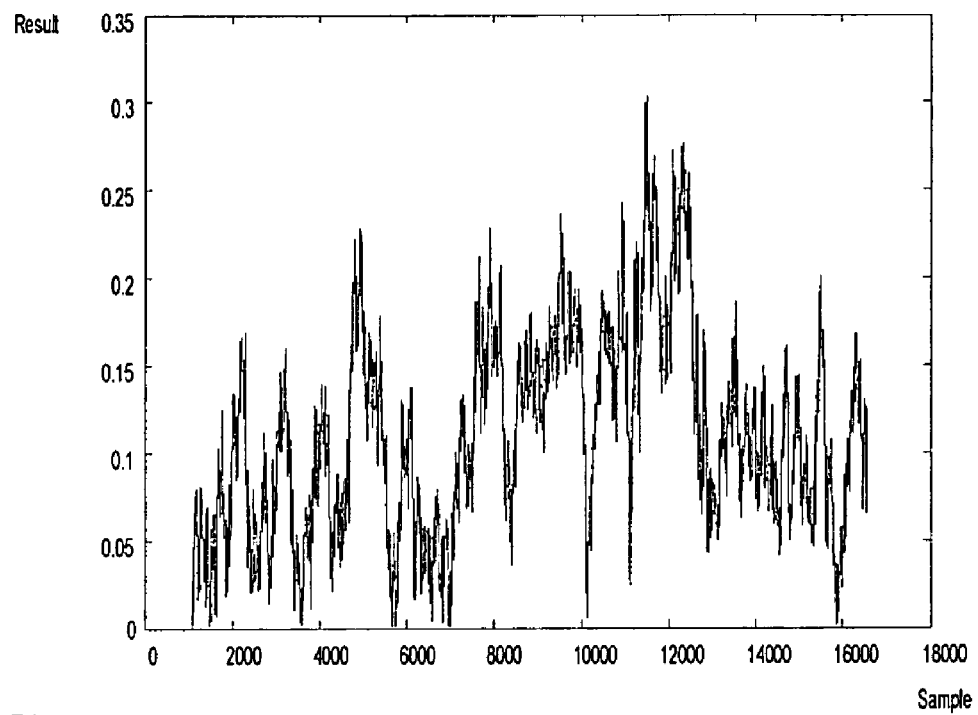
FIG. 5A and FIG. 5B shows simulation results according to the conventional method and the exemplary embodiment of the present invention, respectively.
Figure 5B:
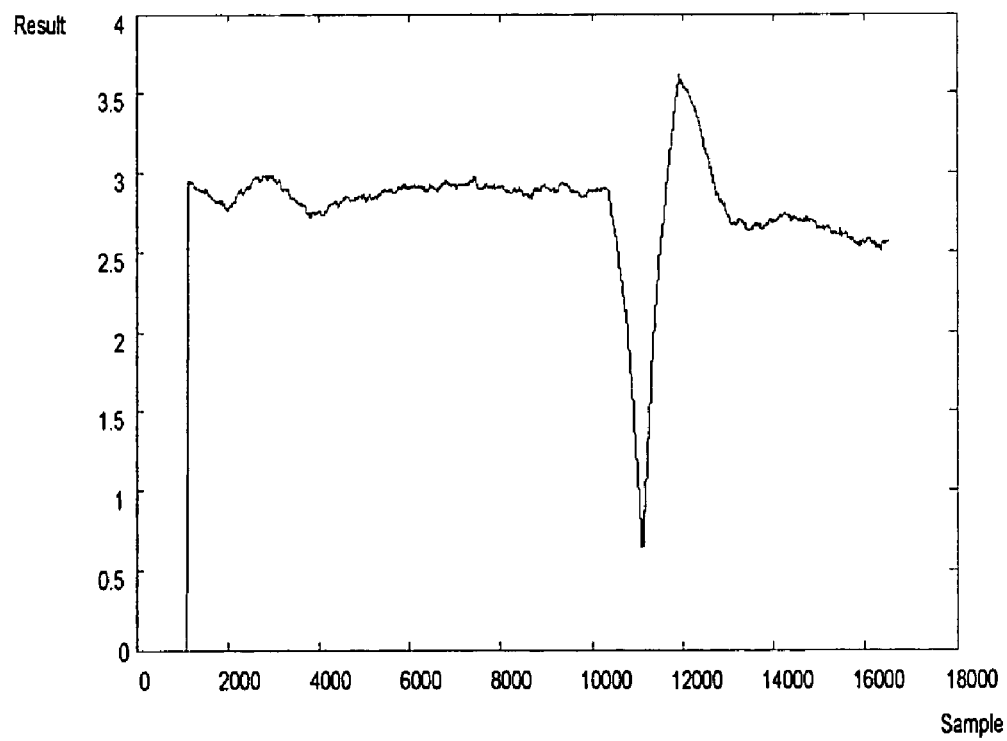

FIG. 5A shows a simulation result according to a conventional method using an auto-correlation characteristic, and FIG. 5B shows a simulation result according to a method for acquiring frame timing according to the exemplary embodiment of the present invention.

When the terminal simultaneously receives signals from three base stations having different segment numbers, a conventional method fails in initial frame timing as shown in FIG. 5A. However, a method for acquiring frame timing according to the exemplary embodiment of the invention easily obtains the sample value having the peak-value as shown in FIG. 5B.

Figure 6A:
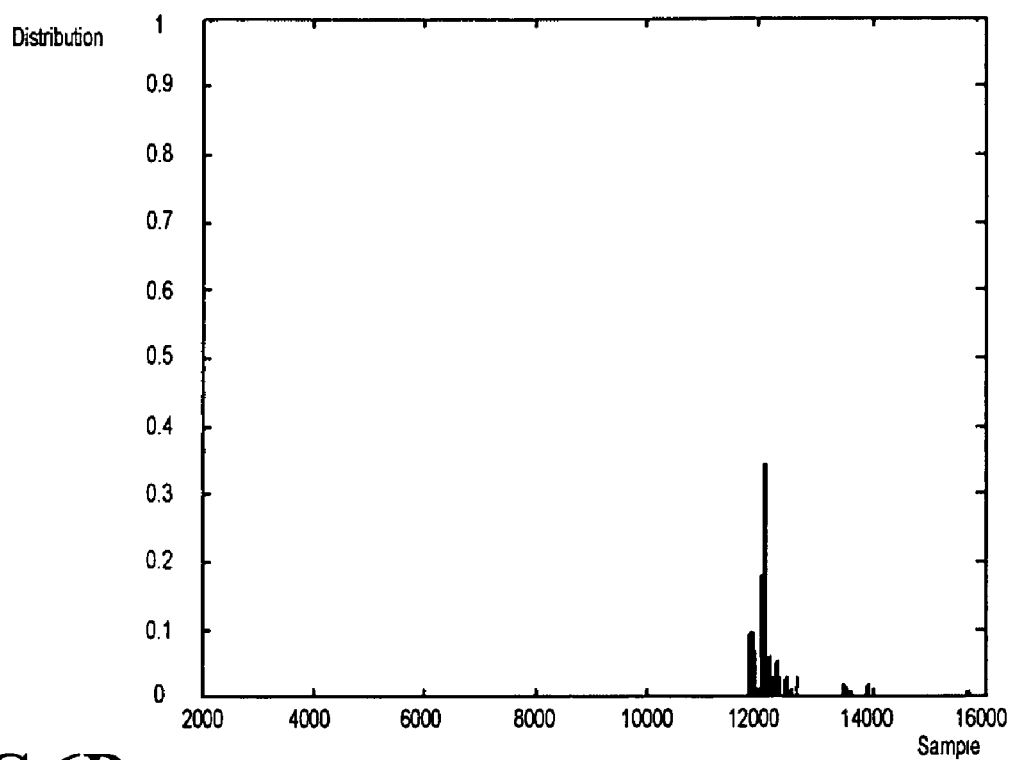
FIG. 6A and FIG. 6B show performance distributions in Gaussian channel according to the conventional method and the exemplary embodiment of the present invention, respectively.
Figure 6B:
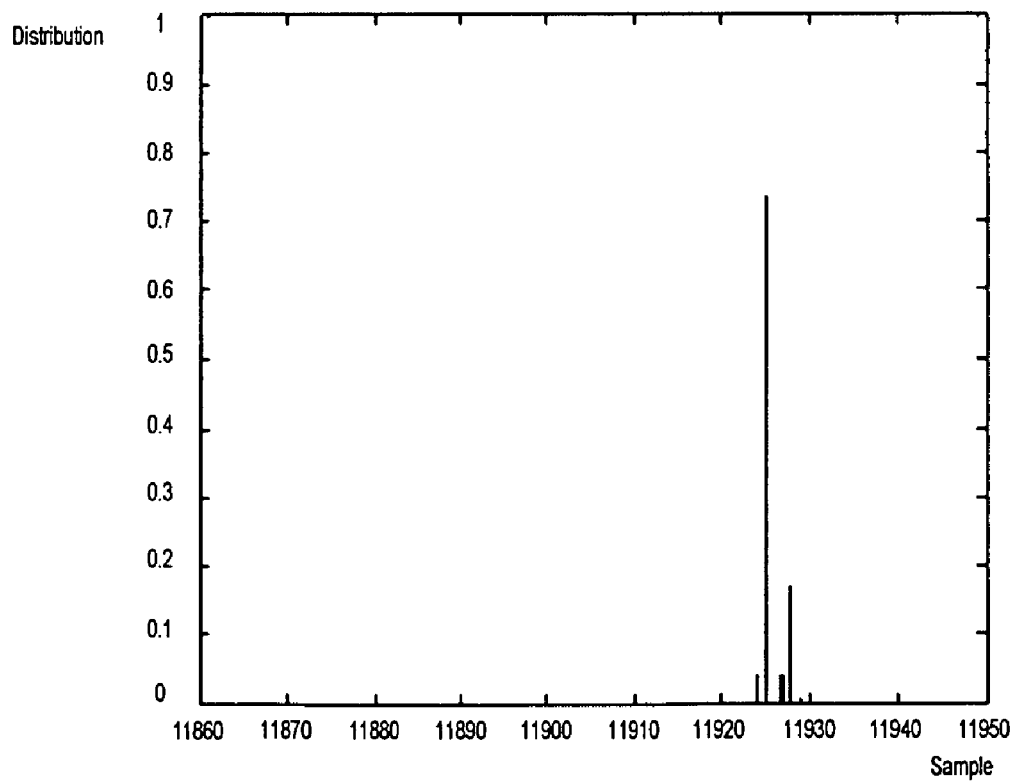

FIG. 6A and FIG. 6B show performance distributions in case that a received signal to noise ratio is 10 dB in Gaussian channel environment. FIG. 6A shows a distribution according to a conventional method, and FIG. 6B shows a distribution according to a method for acquiring frame timing according to the exemplary embodiment of the present invention.

Supposing that the $30^{th}$ sample from a sample having an exact value is a threshold for success in acquiring frame timing, the method using a conventional auto-correlation characteristic shows a success probability of about 35%, as shown in FIG. 6A. However, the method according to an exemplary embodiment of the present invention shows a success probability of over 75%, as shown in FIG. 6B.

Figure 7A:
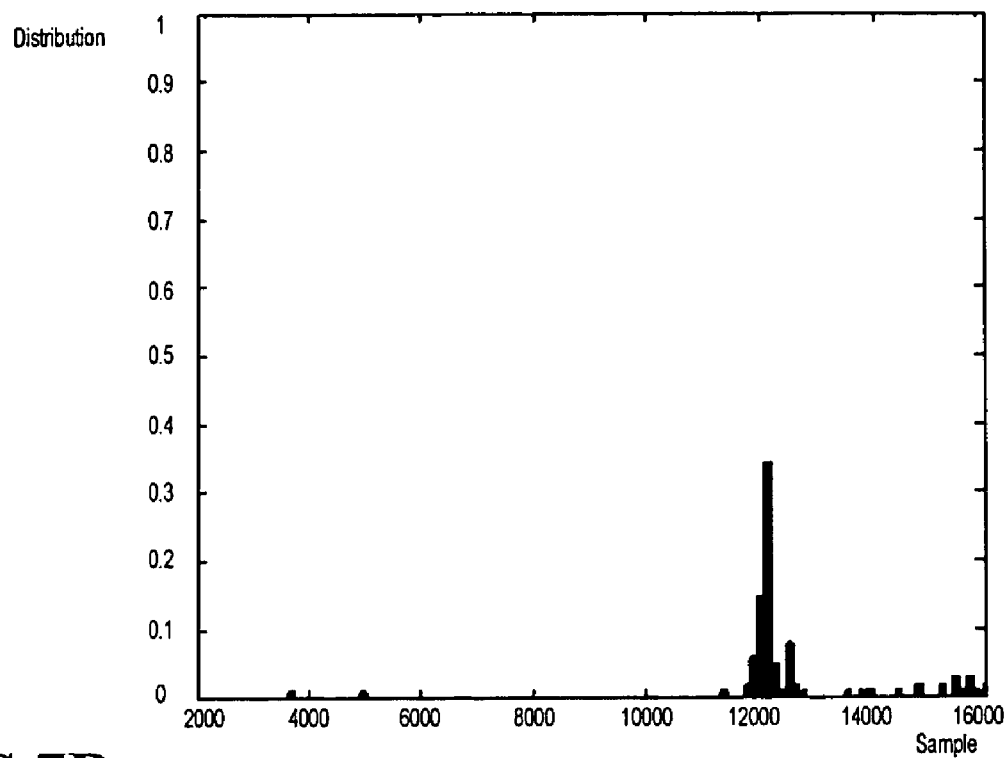
FIG. 7A and FIG. 7B show performance distributions in fading and Gaussian channels according to the conventional method and the exemplary embodiment of the present invention, respectively.
Figure 7B:
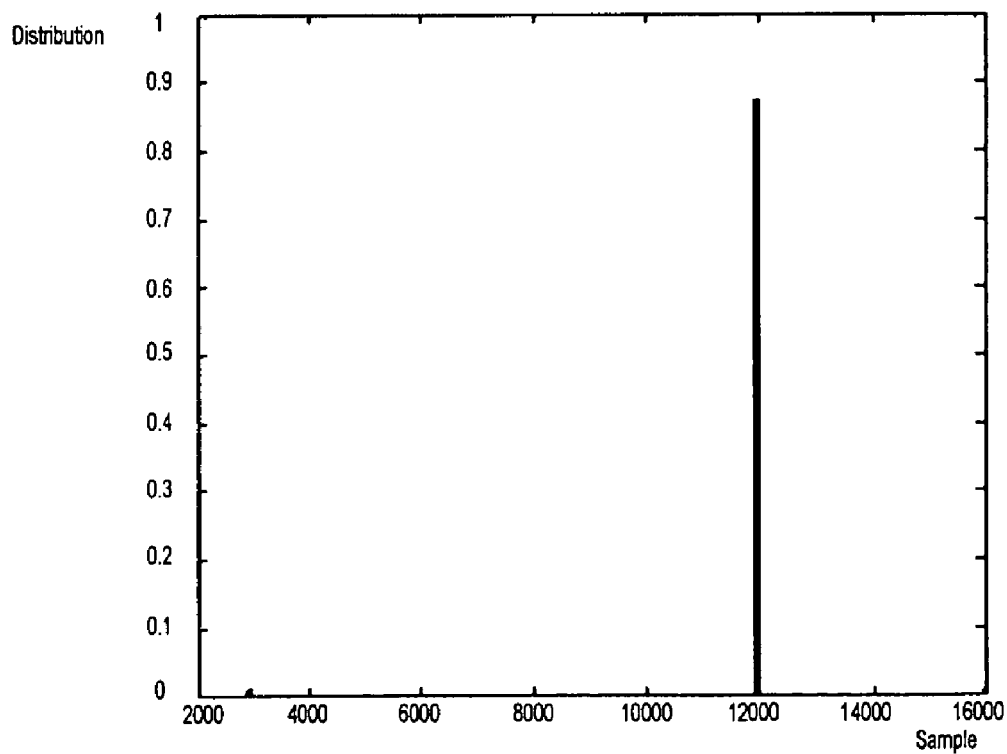

FIG. 7A and FIG. 7B show performance distributions when a received signal to noise ratio is 10 dB in fading and a Gaussian channel environment. FIG. 7A shows a distribution according to a conventional method, and FIG. 7B shows a distribution according to a method according to the present invention.

Supposing that the $30^{th}$ sample from a sample having an exact value is a threshold for success in acquiring frame timing, the method using a conventional algorithm shows a success probability of about 35%, as shown in FIG. 7A. However, the method according to an exemplary embodiment of the present invention shows a success probability of about 90%, as shown in FIG. 7B.

According to the present invention, initial frame timing can be acquired using a high transmission power that is a feature of a preamble signal in a Wi-Bro OFDMA system. With this method, if signals transmitted from three base stations are simultaneously received, the initial frame timing can be successfully acquired. In addition, embodiments of the present invention can be used for acquiring frame timing in a portable terminal Internet service and various OFDMA-based wireless communication systems.

Although the preferred embodiments of the present invention have been disclosed for illustrative purposes, those skilled in the art will appreciate that various modifications, additions and substitutions are possible, without departing from the scope of the present invention. Therefore, the present invention is not limited to the above-described embodiments, but is defined by the following claims, along with their full scope of equivalents.

What is claimed is:

1. An apparatus for acquiring initial frame timing in a communication system, the apparatus comprising:
    a normalizer for calculating a normalized window power from powers of samples of received signal during a monitoring period;
    a cross power calculator for calculating a window cross power from cross powers of the samples during the monitoring period, each cross power corresponding to multiplication of two of the samples;
    a divider for dividing the window cross power by the normalized window power and outputting a metric for a sample corresponding to the monitoring period; and
    a peak-value detector for detecting a maximum value sample among metrics for received signal samples during a predetermined period, the metrics being calculated by shifting the monitoring period,
    wherein a sample next to the sample searched by the peak-value detector is determined as a starting point of a frame, and
    wherein the normalized window power An is calculated by:

$$A_n = \frac{1}{2}\sum_{i=0}^{N}\{|x_{n+i}|^2 + |x_{n+i+m}|^2\}$$

where n denotes a natural number corresponding to a starting position of the monitoring period, $X_{n+i}$ denotes an i-th sample within a window, the window being within the monitoring period, (N+1) is a size of the window, and m is a sample size.

2. The apparatus of claim 1, wherein the normalizer comprises:
    a first normalizer for calculating first powers of first samples and outputting a first average value of the first powers, the first samples being within a window among the samples, the window being within the monitoring period;
    a second normalizer for calculating second powers of second samples and outputting a second average value of the second powers, the second samples being delayed by a predetermined sample time from the first samples;
    an adder for adding each of the first absolute value and each of the second absolute value and outputting the added values; and
    a sliding window accumulator for controlling the first normalizer, the second normalizer and the adder to generate the normalized window power, the normalized window power corresponding to a summation of the added values.

3. The apparatus of claim 1, wherein the cross power calculator comprises:
    a multiplier for multiplying each of first samples and each of second samples and outputting resulting values of the multiplying, the first samples being within a window among the samples, the window being within the monitoring period and the second samples being delayed by a predetermined sample time from the first samples;
    an absolute value calculator for calculating absolute values of the resulting values; and
    a sliding window accumulator for controlling the multiplier and the absolute value calculator so as to generate the window cross power, the cross power corresponding to a summation of the absolute values.

4. The apparatus of claim 1, wherein the normalized window power An+1 corresponding to a second monitoring period shifted from the monitoring period is calculated by:

$$A_{n+1}=A_n-0.5|x_n|^2-0.5|x_{n+m}|^2+0.5|x_{n+N+1}|^20.5|x_{n+N+1+m}|^2.$$

5. The apparatus of claim 1, wherein the window cross power Bn is calculated by:

$$B_n = \sum_{i=0}^{N} |x_{n+i}x_{n+i+341}|$$

where n denotes a natural number corresponding to a starting position of the monitoring period, $x_{n+i}$ denotes an i-th sample within a window, the window being within the monitoring period,
(N+1) is a size of the window, and
m is a sample size.

6. The apparatus of claim 5, wherein the window cross power Bn+1 corresponding to a second monitoring period shifted from the monitoring period is calculated by:

$$B_{n+1}=B_n-|x_n x_{n+m}|+|x_{n+N+1}x_{n+N+1+m}|.$$

7. A method for acquiring initial frame timing in a communication system, the method comprising:
    extracting first samples and second samples delayed from the first samples among samples belonging to a monitoring period while shifting the monitoring period for received signals;
    calculating a ratio between a first value corresponding to cross powers between the first samples and the second samples and a second value corresponding to respective powers of the first and second samples, in each of shifted monitoring periods; and
    setting a sample next to a sample corresponding to the monitoring period having a maximum ratio among the ratios for the shifted monitoring periods as a starting point of a frame,
    wherein the second value An is calculated by:

$$A_n = \frac{1}{2}\sum_{i=0}^{N}\{|x_{n+i}|^2 + |x_{n+i+m}|^2\}$$

where n denotes a natural number corresponding to a starting position of the monitoring period, $X_{n+i}$ denotes an i-th sample within a window, the window being within the monitoring period, (N+1) is a size of the window, and m is a sample size.

8. The method of claim 7, wherein the extracting step comprises:
    setting a window for the samples belonging to the monitoring period; and
    extracting the first samples from the window and the second samples delayed from the first samples from the monitoring period.

9. The method of claim 7, wherein the second value corresponds to an average value of the respective powers of the first and second samples.

10. The method of claim 7, wherein the first value corresponds to a summation of the cross powers.

11. The method of claim 7, wherein the ratio is calculated by dividing the first value corresponding to a summation of the cross powers by the second value corresponding to an average value of the respective powers of the first and second samples.

12. An apparatus for acquiring initial frame timing in a communication system, the apparatus comprising:
   means for extracting first samples within a window and second samples delayed from the first samples among samples of a monitoring period while shifting the monitoring period;
   means for calculating a ratio between a first value corresponding to cross powers between the first samples and the second samples and a second value corresponding to respective powers of the first and second samples, in each of shifted monitoring periods; and
   means for acquiring a starting point of a frame from a maximum ratio among the ratios for the shifted monitoring periods,
wherein the second value An is calculated by:

$$A_n = \frac{1}{2} \sum_{i=0}^{N} \{|x_{n+i}|^2 + |x_{n+i+m}|^2\}$$

where n denotes a natural number corresponding to a starting position of the monitoring period, $X_{n+i}$ denotes an i-th sample within a window the window being within the monitoring period, (N+1) is a size of the window, and m is a sample size.

13. The apparatus of claim 12, wherein the second value corresponds to an average value of the respective powers of the first and second samples.

14. The apparatus of claim 12, wherein the first value corresponds to a summation of the cross powers.

* * * * *